United States Patent
Wood et al.

(10) Patent No.: US 11,431,772 B2
(45) Date of Patent: *Aug. 30, 2022

(54) SKIPPING CONTENT OF LESSER INTEREST WHEN STREAMING MEDIA

(71) Applicant: ROKU, INC., San Jose, CA (US)

(72) Inventors: Anthony Wood, Los Gatos, CA (US); Joseph Hollinger, Los Gatos, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,711

(22) Filed: Jan. 14, 2021

(65) Prior Publication Data

US 2021/0144187 A1    May 13, 2021

Related U.S. Application Data

(63) Continuation of application No. 15/363,236, filed on Nov. 29, 2016, now Pat. No. 10,938,871.

(51) Int. Cl.
*H04L 65/61*    (2022.01)
*H04L 65/60*    (2022.01)
*H04L 67/10*    (2022.01)

(52) U.S. Cl.
CPC ........ *H04L 65/4069* (2013.01); *H04L 65/604* (2013.01); *H04L 67/10* (2013.01)

(58) Field of Classification Search
CPC .... H04L 65/4069; H04L 65/604; H04L 67/10
USPC ...................................................... 709/219
See application file for complete search history.

(56) References Cited

U.S. PATENT DOCUMENTS

| | | | | |
|---|---|---|---|---|
| 9,418,296 | B1* | 8/2016 | Kansara | G11B 27/005 |
| 9,564,177 | B1* | 2/2017 | Gray | H04N 9/8205 |
| 2003/0202773 | A1* | 10/2003 | Dow | G11B 27/105 |
| | | | | 386/251 |
| 2007/0036519 | A1* | 2/2007 | White | G11B 27/10 |
| | | | | 386/249 |
| 2014/0020017 | A1* | 1/2014 | Stern | H04N 21/2747 |
| | | | | 725/34 |
| 2018/0098101 | A1* | 4/2018 | Pont | H04N 21/2408 |

* cited by examiner

*Primary Examiner* — Zi Ye
(74) *Attorney, Agent, or Firm* — Sterne, Kessler, Goldstein & Fox P.L.L.C.

(57) ABSTRACT

Described herein is an example apparatus for skipping a portion of content during streaming of the content to a display device, where the portion is of little or no interest to the user. The apparatus includes a memory having a database stored therein. The database stores metadata relating to the content. The metadata includes an index, where the index stores pointers to portions of the content. The apparatus includes a processor that is communicatively coupled to the memory. In operation, the processor streams the content for display on the display device. When the processor determines an end of a teaser portion has been reached in the stream of the content to the display device, it enables a skip command. Responsive to enabling the skip command, the processor receives command input from the user to skip a title sequence/opening credits portion of the content. Then, the processor determines an end to the title sequence/opening credits portion of the content using the metadata, and advances streaming of the content to the determined end of the title sequence/opening credits portion of the content.

16 Claims, 9 Drawing Sheets

502

SKIPPING CONTENT OF LESSER INTEREST WHEN STREAMING MEDIA

CROSS-REFERENCE TO RELATED APPLICATIONS

This application is related to U.S. patent application Ser. No. 15/363,263 entitled "Enhanced Trick Mode To Enable Presentation of Information Related to Content Being Streamed" by Anthony Wood, filed Nov. 29, 2016, which is hereby incorporated herein by reference in its entirety.

BACKGROUND

Field

This disclosure is generally directed to pre-indexing content to provide enhanced media streaming functionality.

Background

In today's world, on-demand availability of content—such as movies, TV shows and music, to name just a few examples—is commonplace. But the electronic and computerized storage and delivery of content offers the potential for far more than just the availability and vanilla playback of content. For example, through innovative use of technology, it is possible to generate content recommendations that are tailored for individual users, as well as to customize the viewing experience to each user's personal preferences.

But, existing media systems and services still fall short in many areas. For example, many media systems and services require users to experience content in a linear manner, requiring them to view portions of content having little or no interest. Also, too often, media systems and services fail to leverage the immense knowledge base of the Internet and other sources when presenting content to users; thus, while streaming content may be available on an on-demand basis, related information is not, at least not in an easily accessible manner.

SUMMARY

Provided herein are system, apparatus, article of manufacture, method and/or computer program product embodiments, and/or combinations and sub-combinations thereof, for using technology in innovative ways to provide enhanced media streaming functionality.

An embodiment is directed to system, apparatus, article of manufacture, method and/or computer program product embodiments, and/or combinations and sub-combinations thereof, for skipping a portion of content during streaming of the content to a display device, where the portion is of little or no interest to the user. In a non-limiting embodiment, the apparatus may be a media streaming device, and the content may be a movie or a TV program, to name just two examples. The apparatus includes a memory having a database stored therein. The database stores metadata relating to the content. The metadata includes an index, where the index stores pointers to portions of the content. The apparatus includes a processor that is communicatively coupled to the memory. In operation, in some embodiments, the processor streams the content for display on the display device. When the processor determines an end of a teaser portion has been reached in the stream of the content to the display device, it enables a skip command. Responsive to enabling the skip command, the processor receives command input from the user to skip a title sequence/opening credits portion of the content. Then, the processor determines an end to the title sequence/opening credits portion of the content using the metadata, and advances streaming of the content to the determined end of the title sequence/opening credits portion of the content. In this way, the user is able to skip portions of content that have little or no interest.

Another embodiment is directed to system, apparatus, article of manufacture, method and/or computer program product embodiments, and/or combinations and sub-combinations thereof, for displaying information associated with content while streaming the content to a display device. Again, in a non-limiting embodiment, the apparatus may be a media streaming device, and the content may be a movie or a TV program, to name just two examples. The apparatus includes a memory having a database stored therein. The database stores metadata relating to the content. The metadata includes a trick mode index, trick mode images and a database of information associated with segments of the content. The apparatus also includes a processor communicatively coupled to the memory. In operation, in some embodiments, the processor streams the content for display on the display device. The processor implements a trick mode operation upon receiving an appropriate user request. During implementation of the trick mode operation, the processor receives command input requesting information associated with the content. Then, responsive to such command input, the processor retrieves information from the database of information associated with a segment of the content being featured on the display device when the command input was received, and displays the retrieved information on the display device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
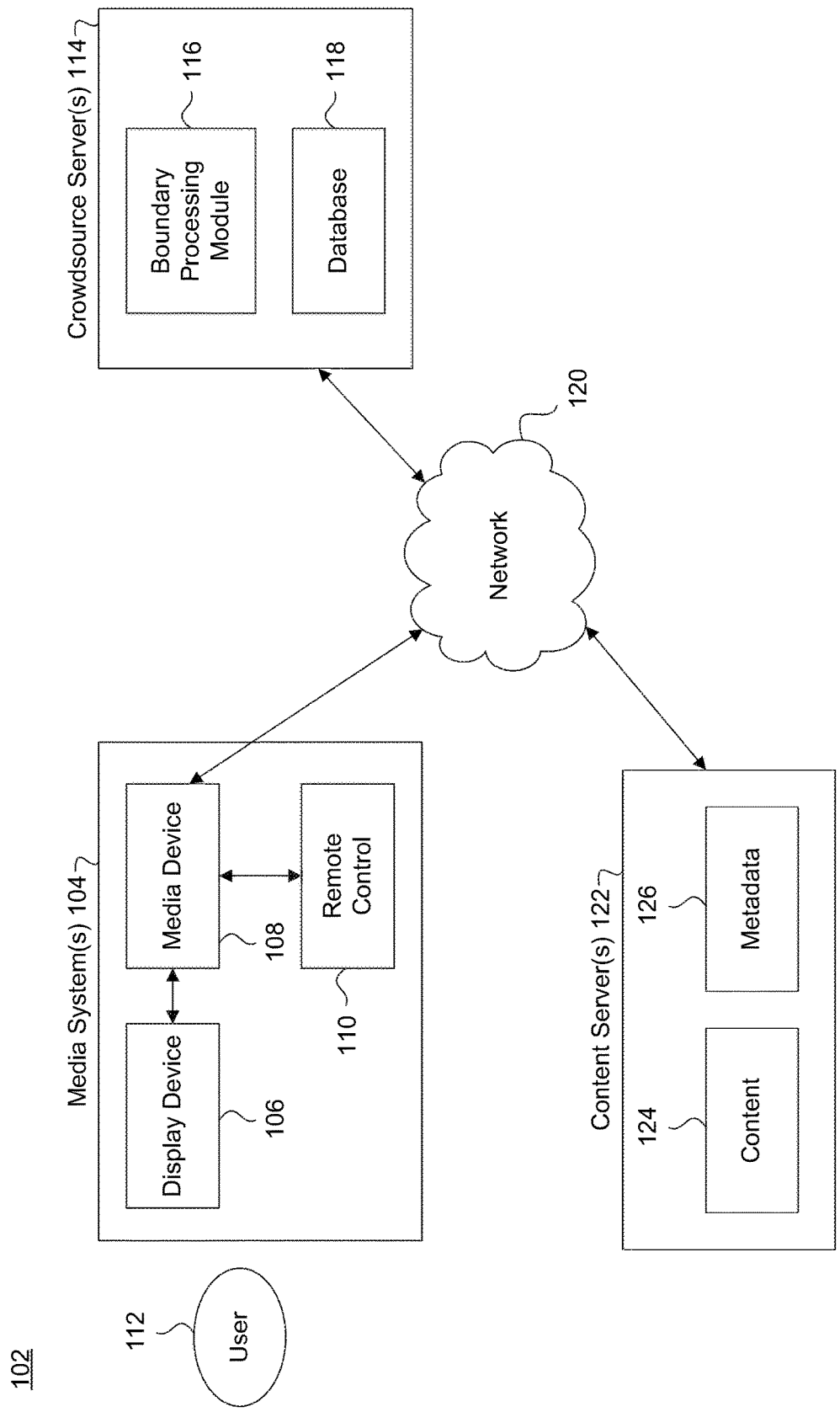
FIG. 1 illustrates a block diagram of a multimedia environment that includes media system(s), crowd source server(s) and content server(s), according to some embodiments.

FIG. 1 illustrates a block diagram of a multimedia environment 102, according to some embodiments. In a non-limiting example, multimedia environment 102 is directed to streaming media.

The multimedia environment 102 may include one or more media systems 104, one or more content servers 122, and one or more crowd source servers 114, communicatively coupled via a network 120. In various embodiments, the network 118 can include, without limitation, wired and/or wireless intranet, extranet, Internet, cellular, Bluetooth and/or any other short range, long range, local, regional, global communications network, as well as any combination thereof.

Media system 104 may include a display device 106, media device 108 and remote control 110. Display device 106 may be a monitor, television, computer, smart phone, tablet, and/or projector, to name just a few examples. Media device 108 may be a streaming media device, DVD device, audio/video playback device, cable box, and/or digital video recording device, to name just a few examples. In some embodiments, the media device 108 can be a part of, integrated with, operatively coupled to, and/or connected to display device 106. The media device 108 may be configured to communicate with network 120.

A user 112 may interact with media system 104 via remote control 110. Remote control 110 can be any component, part, apparatus or method for controlling media device 108 and/or display device 106, such as a remote control, a tablet, laptop computer, smartphone, on-screen controls, integrated control buttons, or any combination thereof, to name just a few examples.

Content servers 120 (also called content sources 120) may each include databases to store content 124 and metadata 126. Content 124 may include any combination of music, videos, movies, TV programs, multimedia, images, still pictures, text, graphics, gaming applications, advertisements, software, and/or any other content or data objects in electronic form. In some embodiments, metadata 126 comprises data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to the content 124. Metadata 126 may also or alternatively include links to any such information pertaining or relating to the content 124. Metadata 126 may also or alternatively include one or more indexes of content 124 (examples of such indexes are further described below with respect to FIGS. 3-4).

Crowd source servers 114 may each include a boundary processing module 116 and a database 118. In some embodiments, boundary processing module 116 receives and processes information identifying portions in content 124 having little or no interest to users. In some crowd sourced embodiments, boundary processing module 116 receives such information from users 112 via their media systems 104. Boundary processing module 116 may store such received information, as well as processing and analysis of such received information, in database 118.

Figure 2:
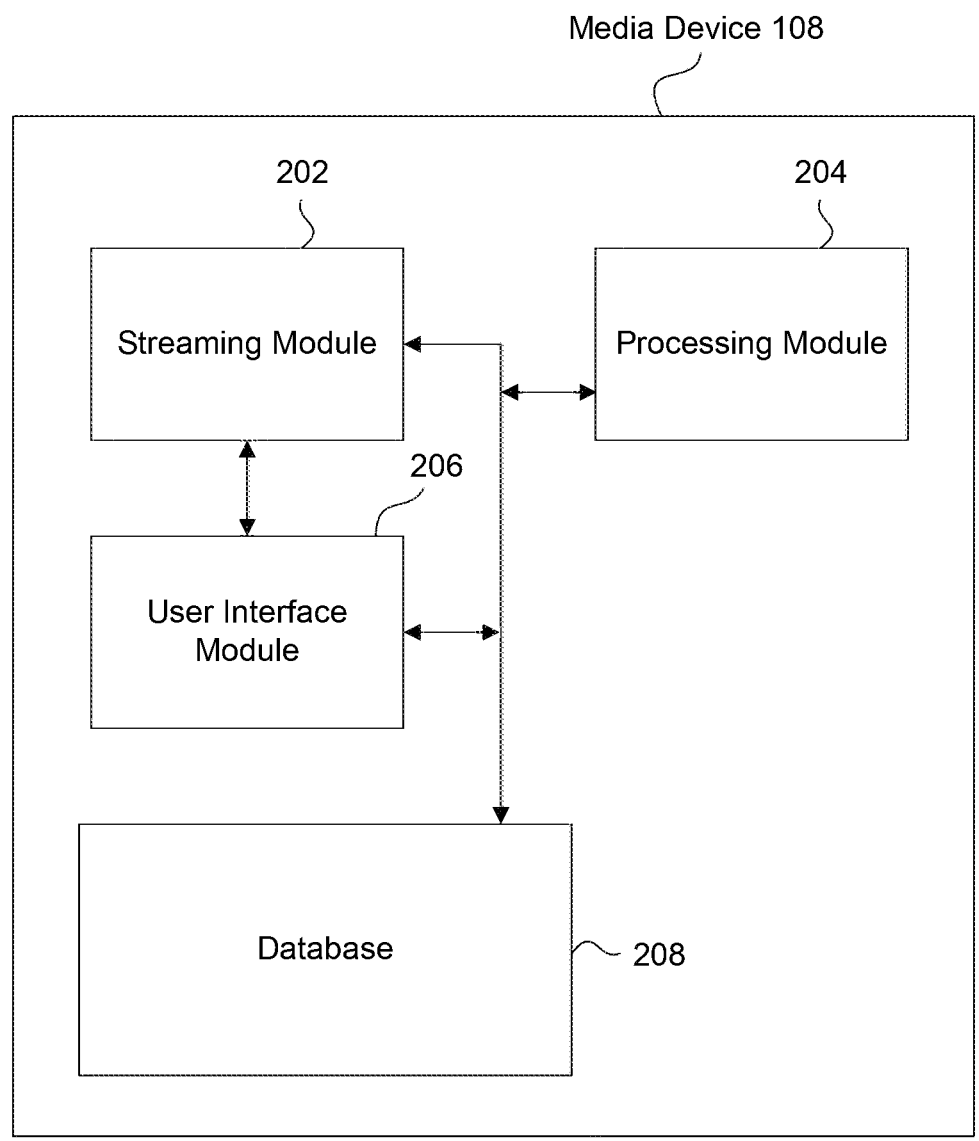
FIG. 2 illustrates a block diagram of a media device, according to some embodiments.

FIG. 2 illustrates an example block diagram of the media device 108, according to some embodiments. Media device 108 may include a streaming module 202, processing module 204, user interface module 206 and database 208.

Now referring to FIGS. 1 and 2, in some embodiments, user 112 may use remote control 110 to interact with media device 108 to select content, such as a movie, TV show, music, book, application, game, etc. Media device 108 may request the selected content from content server(s) 122 over the network 120. Content server(s) 122 may transmit the requested content to media device 108. Media device 108 may transmit the received content to display device 106 for presentation to user 112. In streaming embodiments, media device 108 may transmit the content to display device 106 in real time or near real time as it receives such content from content server(s) 122. In non-streaming embodiments, media device 108 may buffer or store the content received from content server(s) 122 in database 208 for later playback on display device 106.

Skipping Content of Lesser User Interest when Streaming Media

Figure 3:
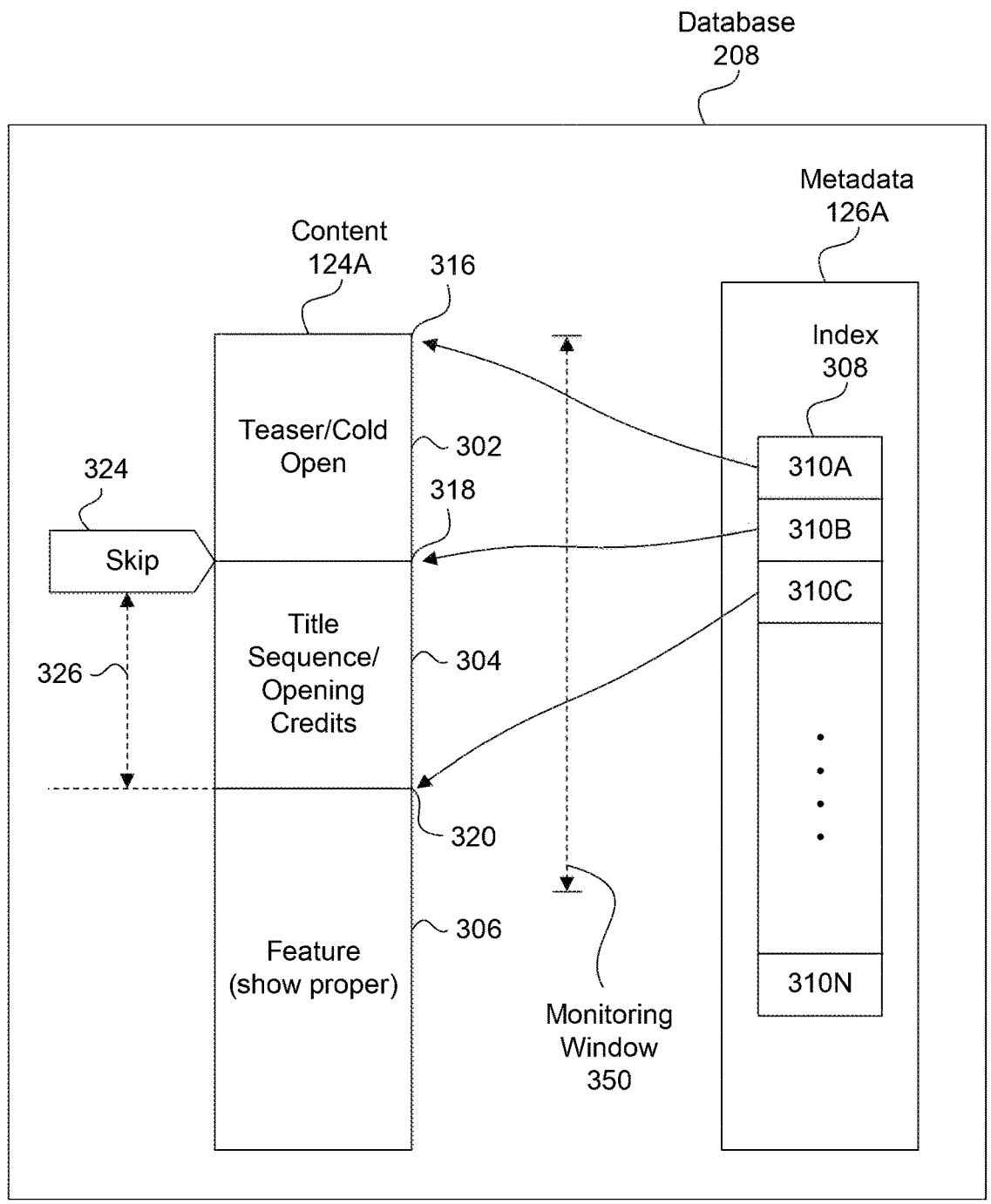
FIGS. 3 and 4 illustrate example databases of a media device, according to some embodiments.

Too often, streaming media systems and services require users to experience streaming content in a linear manner, requiring them to view portions of content having little or no interest. Consider, for example, content 124A shown in FIG. 3 (content 124A may be stored in database 208 of media device 108, as shown in the example of FIG. 3, or streamed from content server(s) 122 via network 120). For non-limiting illustrative purposes, assume content 124A is a television show 124A. Generally, television show 124A has three parts: a teaser 302 (also sometimes called a cold open), a title sequence and/or opening credits 304, and a feature 306 which is the remainder of the television show 124A (sometimes referred to herein as the show proper).

Often when streaming content 124A to her display device 106, the user 112 may wish to skip over the title sequence/opening credits 304. This may be particularly true after the user 112 has already viewed the title sequence/opening credits 304 when watching the first episode of the associated TV series. A conventional solution to skipping over the title sequence/opening credits 304 is using the fast forward function. But this approach is often bulky and inefficient, as the user 112 may fast forward past the end of the title sequence/opening credits 304, and then must rewind back to the beginning of the feature 306. This problem is particularly acute in digital playback systems (such as streaming media players, DVRs, etc.) where the trick mode index may not line up with the end of the title sequence/opening credits 304 (or, equivalently, the beginning of the feature 306).

Also, there is often a blurry line between the end of the title sequence/opening credits 304 and the beginning of the feature 306. Sometimes the feature 306 may overlap with the title sequence/opening credits 304. This may be especially true in streaming applications, for example, where there may not be a commercial or other hard break between the title sequence/opening credits 304 and the feature 306. Thus, trying to use the fast forward function on the remote control 110 to skip over the title sequence/opening credits 304 and go directly to the feature 306 may be a frustrating experience for the user 112.

In some embodiments, to address this problem, metadata 126A is associated with the content 124A. As noted above, the metadata 126A may store information pertaining or relating to the content 124A, and may include index 308. In some embodiments, index 308 may include pointers 310 to content 124A. In particular, index 308 may include pointer 310A that points to the beginning 316 of the teaser 302, pointer 310B that points to the beginning 318 of the title sequence/opening credits 304, and pointer 310C that points to the end 320 of the title sequence/opening credits 304. Index 308 may have other pointers 310 pointing to other points in content 124A.

In some embodiments, content 124A and metadata 126A may be transferred from content server(s) 122 to the user 112's media device 108 over network 120 at the same time (or substantially the same time). In other embodiments, content 124A and metadata 126A may be transferred from content server(s) 122 to the user 112's media device 108 at different times. For example, metadata 126A may be preloaded and stored in database 208 of media device 108, or may be transferred to media device 108 from content server(s) 122 during pauses in the display of content 124A on the display device 106.

Some embodiments may use the pointers 310 in the index 308 to enable a user 112 to easily and effectively skip over the title sequence/opening credits 304. This skip functionality is graphically depicted in FIG. 3 as skip option 324, that when selected by user 112 skips over a portion 326 of content 124A from the beginning 318 of the title sequence/opening credits 304 to the end 320 of the title sequence/opening credits 304.

Figure 5:
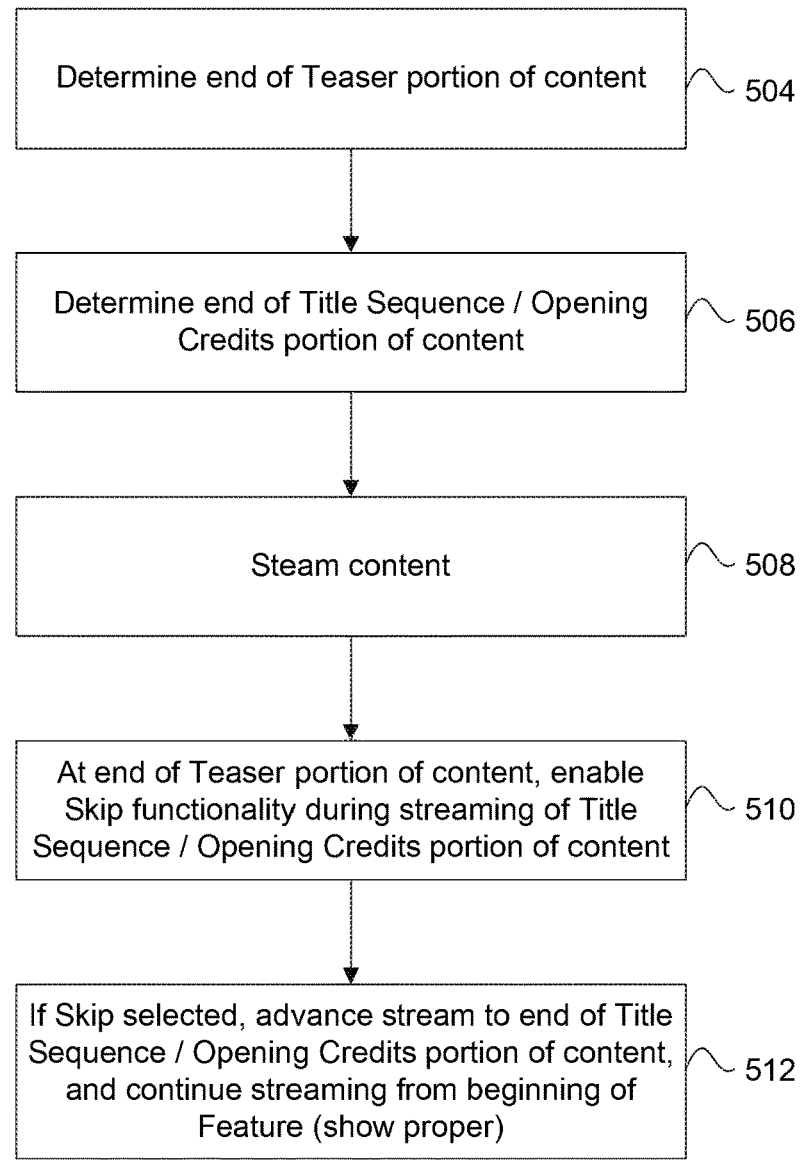
FIG. 5 illustrates a method for enabling a user to skip over uninteresting portion(s) of content when streaming such content, according to some embodiments.

An example of such operation is depicted in FIG. 5, that shows a method 502 for enabling a user to skip over uninteresting portion(s) of content when streaming such content, according to some embodiments. Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

For illustrative purposes, FIG. 5 is described with reference to FIGS. 1-3, but the method 502 is not limited to these example embodiments.

In 504, media device 108 in the user 112's media system 104 may determine the end of the teaser 302 (or, equivalently, the beginning of the title sequence/opening credits 304) in content 124A. For example, in 504, the processing module 204 of media device 108 may access the index 308 in the metadata 126A stored in database 208, and retrieve pointer 310B that points to the end 318 of the teaser 302.

In 506, media device 108 may determine the end of the title sequence/opening credits 304 in content 124A. For example, in 506, the processing module 204 may access the index 308 in the metadata 126A, and retrieve pointer 310C that points to the end 320 of the title sequence/opening credits 304.

In 508, media device 108 may begin streaming the content 124A for playback on the display device 106. For example, in 508, the streaming module 202 of media device 108 may begin streaming the content 124A to the display device 106, either as the content 124 is received from content servers 122 over network 120, or by retrieving content 124 from database 208. It is noted that operation 508 may begin prior to operation 504, or at any time in parallel with operations 504 and 506.

In 510, processing module 204 and/or streaming module 202 may determine when the end 318 of the teaser 302 has been reached in the stream of the content 124A to the display device 106. When the end 318 of the teaser 302 has been reached, and while continuing to stream the content for playback on the display device 106, the user interface module 206 in the media device 108 may display a "skip" icon (such as the example skip icon 324 in FIG. 3) on the display device 106. For example, the skip icon 324 may be displayed in a location on display device 106 outside the window wherein the content 124A is being displayed. In some embodiments, the skip icon 324 may be displayed on the display device 106 during the entire period when the title sequence/opening credits 304 are being streamed to and played back on display device 106.

In 512, if the user 112 selects the skip icon 324 (using remote control 110, for example), then the streaming module 202 may use pointer 310C in index 308 to access the end 320 of the title sequence/opening credits 304. Then, the streaming module 202 may advance the streaming of content 124A to display device 106 to that end 320 of the title sequence/opening credits 304. In this manner, the user 112 is able to skip playback of the title sequence/opening credits 304 at any point during its presentation on display device 106.

In some embodiments, flowchart 502 is performed only if the content 124A is not the first episode in a series (such as a TV series or a series of movies). In this manner, the title sequence/opening credits 304 are presented to the user 112 during playback of the first episode in a series (although the user 112 can still use conventional fast forward functionality to skip the title sequence/opening credits 304). In other embodiments, flowchart 502 is performed for all episodes in a series.

In some embodiments, the index 308 may be populated by manually linking the pointers 310 to particular points in the content 124A. For example, the beginning 316 and end 318 of the teaser 302 may be manually located in the content 124A. Then, the values of pointers 310A and 310B in the index 308 may be manually set to respectively point to these locations in content 124A. Similarly, the end 320 of the title sequence/opening credits 304 may be manually located in the content 124A, and then the value of pointer 310C may be set to point to this location.

In other embodiments, the index 308 may be populated using a crowd sourced approach wherein users 112 at media systems 104 collectively identify points of interest in content 124, such as but not limited to the beginning 316 and end 318 of the teaser 302 and the end 320 of the title sequence/opening credits 304. An example embodiment of such an approach is shown as flowchart 602 in FIG. 6. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. For illustrative purposes, method 602 is described with reference to FIGS. 1-3 although it is not limited to these example embodiments.

In 604, media device 108 (such as streaming module 202 and/or user interface module 206) may detect a fast forward command issued by the user 112 while content 124A is being streamed to display device 106. The media device 108 may record the point in content 124A that was being displayed on display device 106 when the fast forward command was received. The point may be denoted as position 1, or P1. In some embodiments, operation 604 is performed only for the first fast forward detected while streaming the content 124A to the display device 106.

In 606, media device 108 (such as streaming module 202 and/or processing module 204) may determine if P1 occurs within a monitoring window 350 of content 124A. In some embodiments, the monitoring window 350 is a portion of the content 124A where the title sequence/opening credits 304 normally occurs. For example, the monitoring window 350 may be set to the first 5-10 minutes of the content 124A.

If P1 is outside the monitoring window 350, then it is likely the user 112's fast forward command is not related to skipping the title sequence/opening credits 304. Thus, the flowchart ends at 608.

If P1 is within the monitoring window 350, then it is possible the user 112's fast forward command is for the purpose of skipping the title sequence/opening credits 304. Accordingly, the media device 108 (such as streaming module 202 and/or user interface module 206) may monitor and detect when the user 112 discontinues the fast forward operation. The media device 108 may record the point in content 124A that was being displayed on display device 106 when the fast forward command was discontinued. The point may be denoted as position 2, or P2.

In 612, the media device 108 may store P1 and P2 in database 208.

In 614, periodically or at predefined times, media device 108 may upload P1 and P2 to crowd source server(s) 114 via network 120.

In some embodiments, operations 604-612 may be performed by media device 108 whenever the content 124A is played from the beginning 316 on the display device 106. Additionally or alternatively, operations 604-612 may be performed by media device 108 for every fast forward command detected within the monitoring window 350. Accordingly, multiple P1/P2 sets may be stored in database 208 when operation 614 is performed. In such cases, the media device 108 in 614 may upload to the crowd source server(s) 114 all of the P1/P2 sets stored in database 208 at the time operation 614 is performed.

In some embodiments, operations 604-614 are performed by any combination of media systems 104 in the multimedia environment 102.

In 616, boundary processing module 116 in crowd source server 114 may use the P1/P2 timing information associated with the content 124A, received from media systems 104 as well as stored in database 208, to generate a crowd sourced determination of the beginning 318 and the end 320 of the title sequence/opening credits 304 of the content 124A. In some embodiments, the boundary processing module 116 in 616 may average the P1s to generate a crowd sourced determination of the beginning 318 of the title sequence/opening credits 304, and may average the P2s to generate a crowd sourced determination of the end 320 of the title sequence/opening credits 304, or may process the P1s and P2s using any other system defined statistical or mathematical function or process to generate crowd sourced values of the beginning 318 and the end 320 of the title sequence/opening credits 304 of the content 124A. The P1s, P2s and crowd sourced values of the beginning 318 and the end 320 of the title sequence/opening credits 304 of the content 124A may be stored in database 118.

In 618, the crowd source server 114 may transmit the crowd sourced values of the beginning 318 and the end 320 of the title sequence/opening credits 304 of the content 124A to the content servers 122 and/or media devices 108 for storage in the index 308 of metadata 126A.

Figure 6:
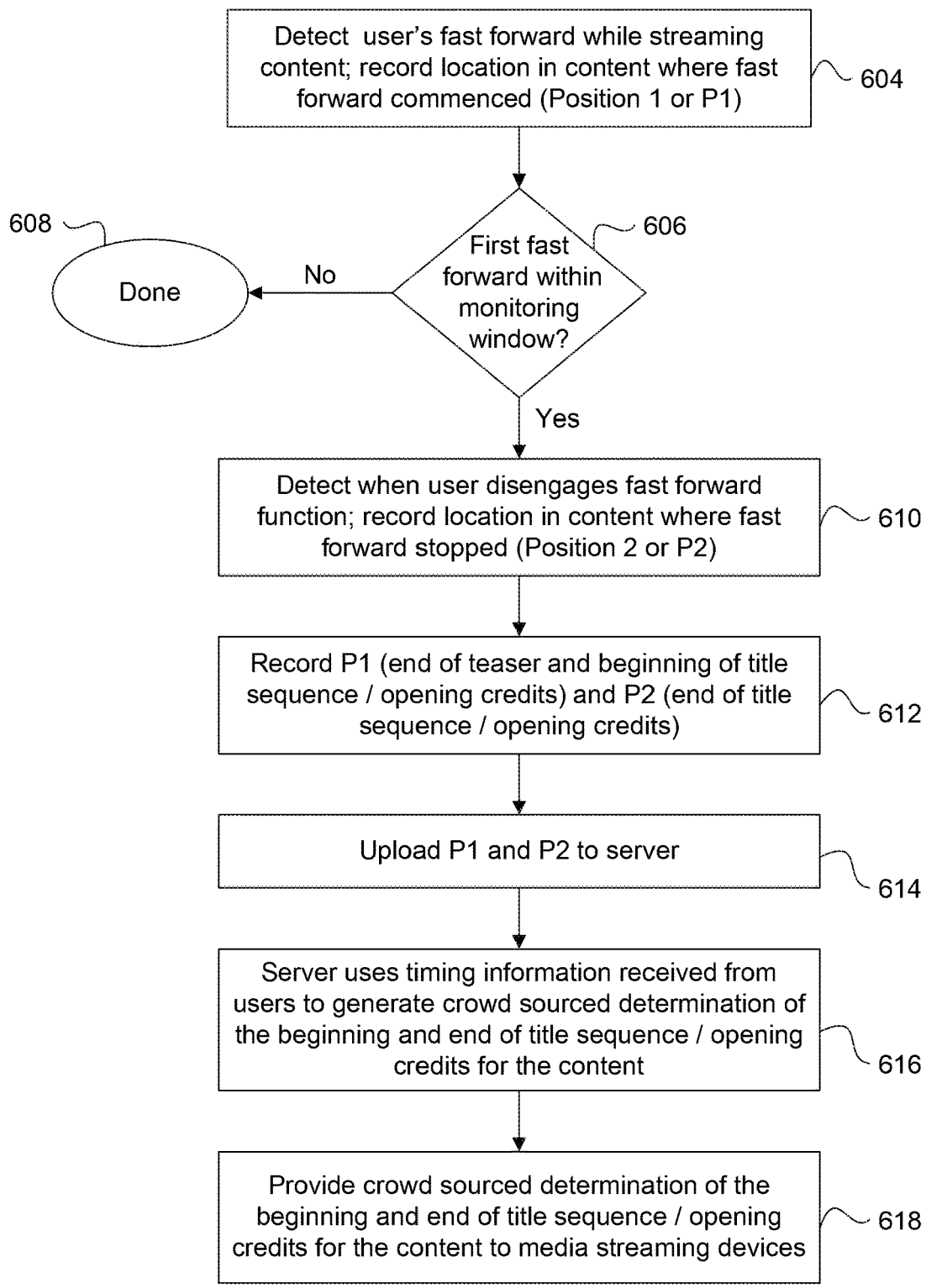
FIG. 6 illustrates a method for crowd sourced identification of particular portion(s) of content, according to some embodiments.

Embodiments of this disclosure are not limited to skipping the title sequence/opening credits 304 of content 124A. Rather, embodiments are applicable to skipping any portion or portions of any given content of little interest to users 112, where the boundaries of such portion(s) may be manually determined, or determined in a crowd sourced manner as shown in FIG. 6, and then skipped per user command as shown in FIG. 5.

Figure 4:
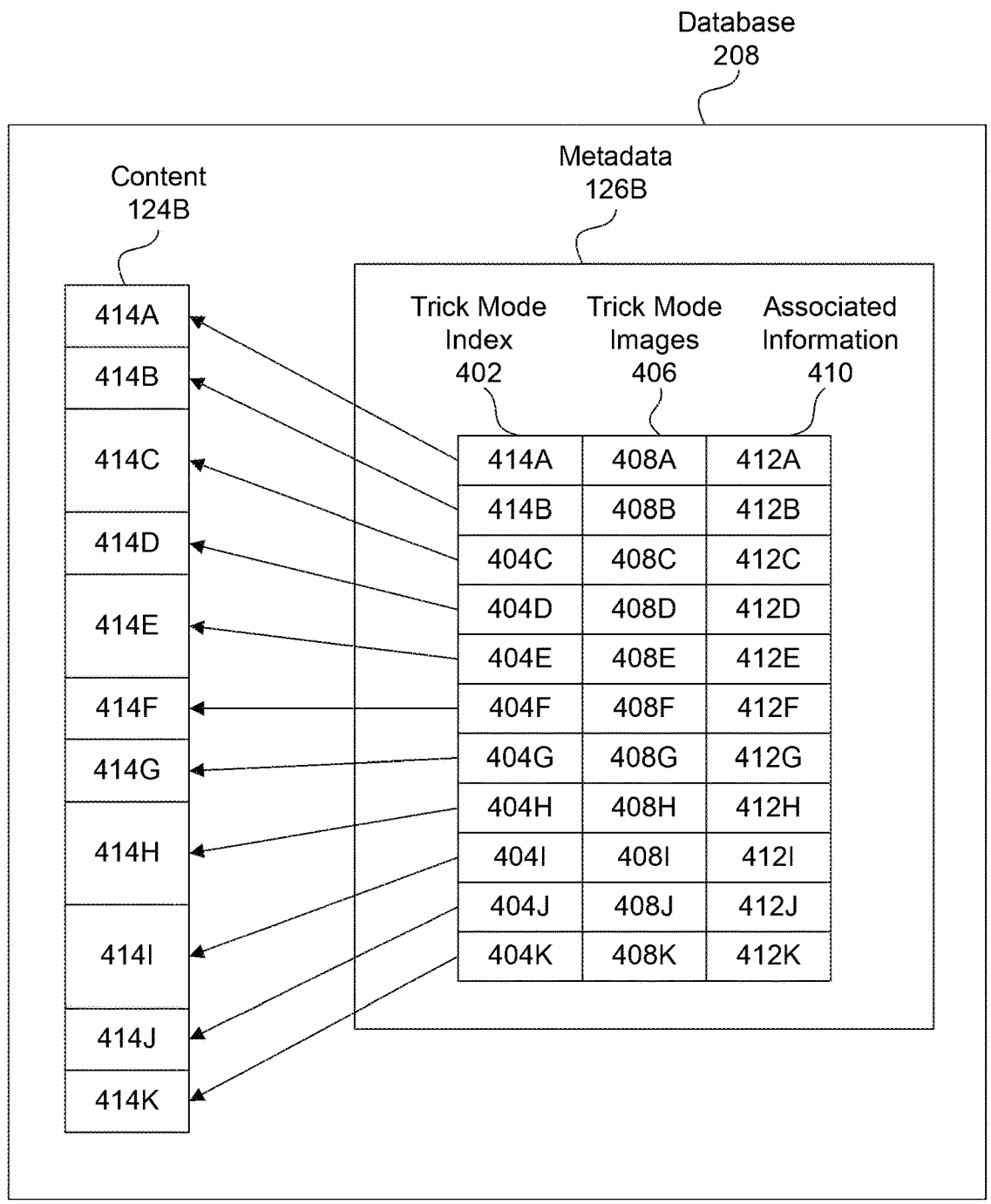

Enhanced Trick Mode to Enable Presentation of in Formation Related to Content being Streamed According to some embodiments, trick mode is an ability in digital media devices to fast forward, rewind, pause, or otherwise manipulate content 124 (at one or more speeds) during display on a display device 106. An example data structure embodiment of trick mode is illustrated in FIG. 4, wherein content 124B is stored in database 208 of media device 108 (or may be streamed from content server(s) 122 to media device 108 via network 120). Content 124B has a plurality of segments 414. Some segments 414 may be the same size and some may be different. Or, the segments 414 may all be the same size or different sizes.

Metadata 126B may be associated with content 124B and may store information pertaining or relating to content 124B. Metadata 126B may be stored in database 208. Metadata 126B may include a trick mode index 402 and trick mode images 406. Trick mode index 402 may include a pointer 404 to each segment 414 of content 124B. Similarly, trick mode images 406 may include an image 408 for each segment 414 of content 124B. Thus, for example, pointer 404A in trick mode index 402 and image 408A in trick mode images 406 correspond to segment 414A of content 124B.

In some embodiments, when media device 108 requests content 124B from content server(s) 122, content server(s) 122 may transmit the requested content 124B as well as the associated metadata 126B (at the same time or at different times) to media device 108. When media device 108 receives a trick mode request from the user 112 (such as a request to rewind or fast forward the display of content 124B), media device 108 may access the metadata 126B and use the trick mode index 402 and the trick mode images 406 to perform the requested trick mode operation on the display device 106. In particular, the media device 108 may display the trick mode images 408 corresponding to content segments 414 (as identified by the pointers 404) as the content 124 is fast forwarded on the display device 106. For example, during a fast forward operation, the media device 108 may display trick mode image 408E on the display device 106 when the fast forward operation reaches content segment 414E, wherein this trick mode image 408E may be identified and accessed using pointer 404E.

In some embodiments, the metadata 126B may also include associated information 410. The associated information 410 may include information 412 pertaining or relating to each content segment 414. Such information 412 may identify, indicate and/or relate to writer, director, producer, composer, artist, actor, summary, chapters, production, history, year, trailers, alternate versions, related content, applications, and/or any other information pertaining or relating to the content 124. Information 412 may also or alternatively include links to any such information pertaining or relating to the content 124.

Figure 7:
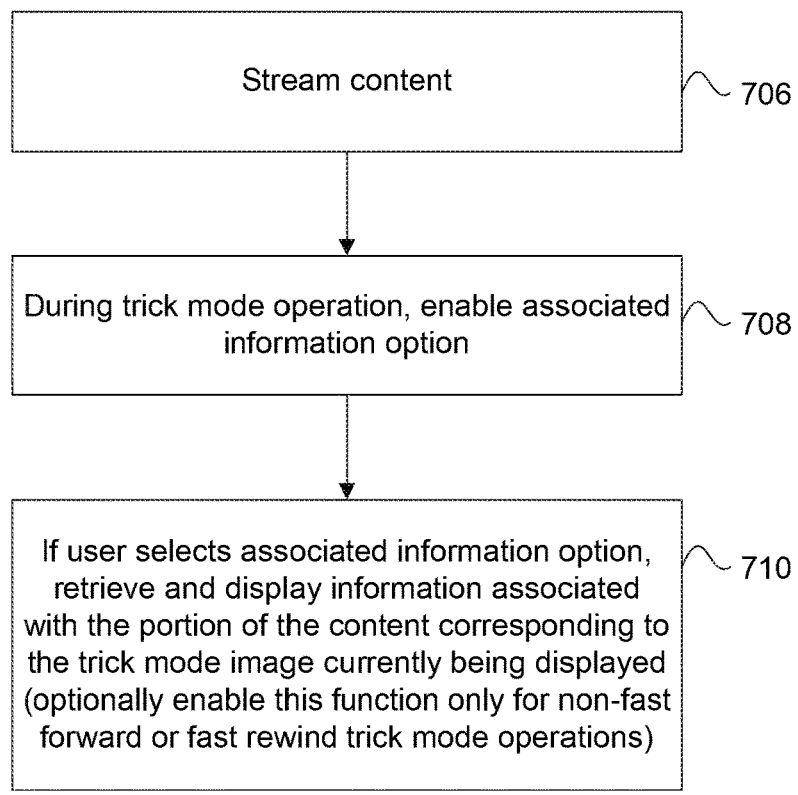
FIG. 7 illustrates a method for enabling users to select and view ancillary or associated information when streaming content using an enhanced trick mode, according to some embodiments.
Figure 8:
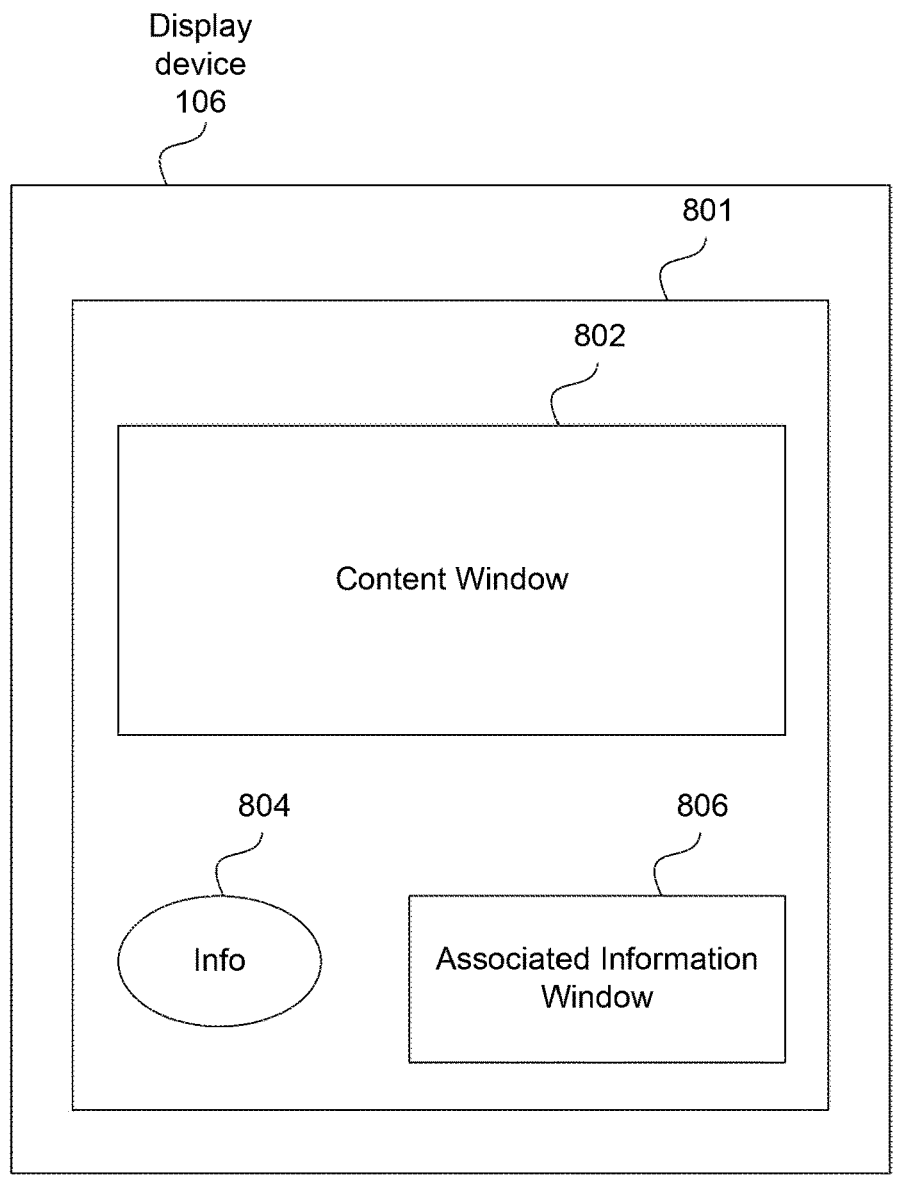
FIG. 8 illustrates an example screen shot displayed on a display device, according to some embodiments

FIG. 7 illustrates a method 702 for enabling users to select and view information relating to content when streaming and displaying such content using enhanced trick mode functionality, according to some embodiments. Method 702 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. For illustrative purposes, method 702 is described with reference to FIGS. 1, 2, 4 and 8 although it is not limited to these example embodiments (FIG. 8 illustrates an example screen shot 801 displayed on display device 106, according to some embodiments).

In 706, content 124B may be streamed to display device 106 in the user 112's media system 104. For example, content server(s) 122 in 706 may stream content 124B to media device 108. Content server(s) 122 may also stream metadata 126B relating to content 124B to media device 108 (at the same time as the streaming of content 124B, or different times). The media device 108 may transfer the received content 124B to display device 106 for playback to user 112. In some embodiments, the content 124B may be displayed in a content window 802 on the display device 106.

In 708, user interface module 206 in the media device 108 may receive a request for a trick mode operation from user 112 (via, for example, remote control 110). The requested trick mode operation may be fast forward, rewind, pause, of any other manipulation of the display of content 124B on display device 106. Streaming module 202 (working with processing module 204, for example) in 708 may implement the requested trick mode operation on the display device 106 using the trick mode index 402 and trick mode images 406 in the metadata 126B. For example, during a trick mode fast forward operation, the streaming module 202 may display trick mode images 408 in the content window 802 on the display device 106 when the fast forward operation reaches content segments 414 corresponding to those trick mode images 408, wherein the trick mode images 408 may be identified and accessed using associated pointers 404.

Also in 708, while implementing the requested trick mode operation, the streaming module 202 (working with processing module 204, for example) may enable an "associated information" option. For example, the streaming module 202 may display an "Info" button 804 at a location on display device 106 outside the content window 802 where the content 124B is being displayed.

In 710, if the user 112 selects the Info button 804 or otherwise selects the "associated information" option (using, for example, the remote control 110), the streaming module 202 (working with the processing module 204, for example) may retrieve associated information 412 corresponding to the content segment 414 currently being displayed (that is, featured) via trick mode on the display device 106, and may display such retrieved associated information 412 in an associated information window 806 on the display device 106. The associated information window 806 may partially or fully overlap with the content window 802, or may not overlap at all (this latter case is shown in the example of FIG. 8).

For example, assume during a trick mode fast forward operation, trick mode image 4081 corresponding to content segment 4141 is being displayed in the content window 802 on the display device 106. If, at this time, the user 112 presses the Info button 804, then the streaming module 202 may use the associated pointer 4041 to retrieve the associated information 4121 corresponding to content segment 4141, and may display the retrieved associated information 4121 in the associated information window 806.

In some embodiments, in 710, the trick mode operation is suspended when the user 112 selects the Info button 804 and the retrieved associated information 4121 is displayed in the associated information window 806. This is done to allow the user 112 to view the information in the associated information window 806. The trick mode operation is resumed when the user 112 selects the Info button 804 a second time.

In some embodiments, operations 708 and 710 may be available only for non-fast forward and non-fast rewind trick mode operations. In other embodiments, operations 708 and 710 may be available for all trick mode operations.

Example Computer System

Figure 9:
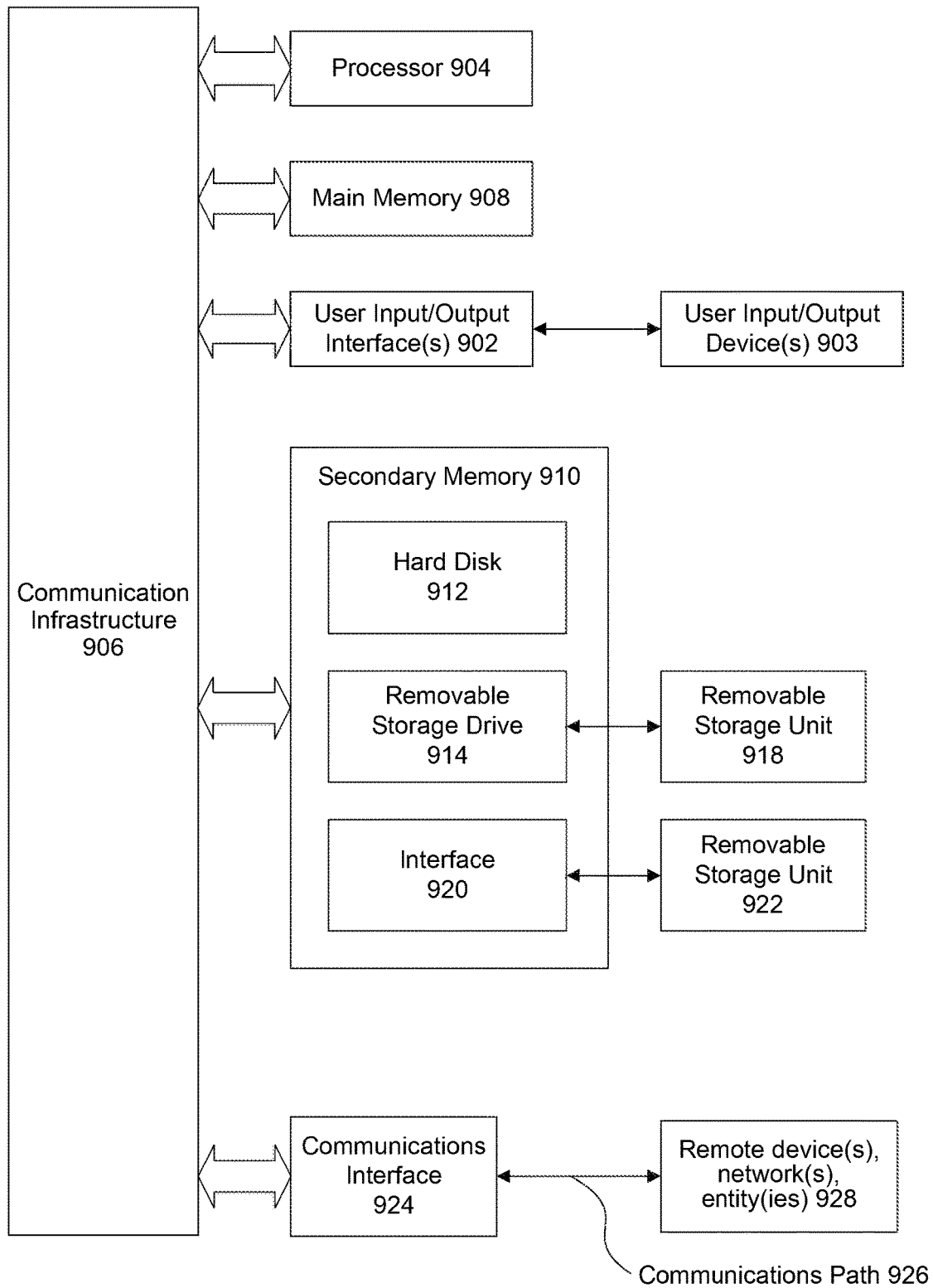
FIG. 9 illustrates an example computer system useful for implementing various embodiments.

Various embodiments and/or components therein can be implemented, for example, using one or more computer systems, such as computer system 900 shown in FIG. 9. Computer system 900 can be any computer or computing device capable of performing the functions described herein. For example, one or more computer systems 900 can be used to implement the devices and operations of FIGS. 1-8.

Computer system 900 includes one or more processors (also called central processing units, or CPUs), such as a processor 904. Processor 904 is connected to a communication infrastructure or bus 906.

One or more processors 904 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 can include other means, instrumentalities or other approaches for allowing computer programs and/or other instructions and/or data to be accessed by computer system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924.

Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In some embodiments, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

Conclusion

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An apparatus for advancing past a portion of content during streaming of the content to a display device, comprising:

a memory comprising at least one database, the database comprising crowdsourced metadata relating to the content, the metadata comprising an index, the index comprising pointers to portions of the content; and at least one processor, communicatively coupled to the memory and configured to:

stream the content for display on the display device;

determine an end of a teaser portion has been reached in the stream of the content to the display device using the crowdsourced metadata;

enable a skip command, responsive to the determining the end of the teaser portion has been reached in the stream of the content to the display device using the crowdsourced metadata, wherein enabling the skip command comprises providing a skip icon corresponding to the enabled skip command for display on the display device during a title sequence/opening credits portion of the content;

responsive to enabling the skip command, receive input selecting the skip icon to advance past the title sequence/opening credits portion of the content;

determine an end to the title sequence/opening credits portion of the content using the crowdsourced metadata; and advance the streaming of the content to the end of the title sequence/opening credits portion of the content.

2. The apparatus of claim 1, wherein to determine the end of the teaser portion has been reached, the at least one processor is further configured to:

access the index in the crowdsourced metadata;

access a first pointer in the index corresponding to the end of the teaser portion in the content; and use the first pointer to determine that the end of the teaser portion has been reached in the stream of the content to the display device.

3. The apparatus of claim 2, wherein to determine the end to the title sequence/opening credits portion of the content, the at least one processor is further configured to:

access the index in the crowdsourced metadata; and access a second pointer in the index corresponding to the end of the title sequence/opening credits portion of the content;

wherein to advance the streaming of the content, the at least one processor is further configured to use the second pointer to advance the streaming of the content to the end of the title sequence/opening credits portion of the content.

4. The apparatus of claim 3, wherein the at least one processor is further configured to:
- receive command input to begin a fast forward operation;
- determine a first location in the streaming of the content corresponding to the receipt of the command input to begin the fast forward operation;
- receive command input to discontinue the fast forward operation;
- determine a second location in the streaming of the content corresponding to the receipt of the command input to discontinue the fast forward operation; and
- provide information identifying the first location and the second location to at least one crowd source server, wherein the at least one crowd source server uses the information from a plurality of media devices to determine crowd sourced determinations of the end of the teaser portion in the content and the end of the title sequence/opening credits portion of the content.

5. The apparatus of claim 4, wherein the at least one processor to determine the first location is further configured to:
- determine the first location is within a monitoring window associated with the content.

6. The apparatus of claim 1, wherein the providing the skip icon is discontinued at a completion of the title sequence/opening credits portion of the content.

7. A method of skipping a portion of content during streaming of the content to a display device, comprising:
- streaming the content for display on the display device;
- determining an end of a teaser portion has been reached in the streaming of the content to the display device;
- enabling a skip command, responsive to the determining the end of the teaser portion has been reached in the streaming of the content to the display device using crowdsourced metadata related to the content, wherein enabling the skip command comprises providing a skip icon corresponding to the enabled skip command for display on the display device during a title sequence/opening credits portion of the content;
- responsive to enabling the skip command, receiving input selecting the skip icon to skip the title sequence/opening credits portion of the content;
- determining an end to the title sequence/opening credits portion of the content using the crowdsourced metadata; and
- advancing the streaming of the content to the end of the title sequence/opening credits portion of the content.

8. The method of claim 7, wherein the determining the end of the teaser portion has been reached comprises:
- accessing an index in the crowdsourced metadata;
- accessing a first pointer in the index corresponding to the end of the teaser portion in the content; and
- using the first pointer to determine that the end of the teaser portion has been reached in the streaming of the content to the display device.

9. The method of claim 8, wherein the determining the end to the title sequence/opening credits portion of the content comprises:
- accessing the index in the crowdsourced metadata; and
- accessing a second pointer in the index corresponding to the end of the title sequence/opening credits portion of the content;
- wherein the advancing the streaming of the content comprises using the second pointer to advance the streaming of the content to the end of the title sequence/opening credits portion of the content.

10. The method of claim 9, further comprising:
- receiving command input to begin a fast forward operation,
- determining a first location in the streaming of the content corresponding to the receipt of the command input to begin the fast forward operation;
- receiving command input to discontinue the fast forward operation;
- determining a second location in the streaming of the content corresponding to the receipt of the command input to discontinue the fast forward operation; and
- providing information identifying the first location and the second location to at least one crowd source server, wherein the at least one crowd source server uses the information from a plurality of media devices to determine crowd sourced determinations of the end of the teaser portion in the content and the end of the title sequence/opening credits portion of the content.

11. The method of claim 10, wherein the determining the first location comprises:
- determining the first location is within a monitoring window associated with the content.

12. A non-transitory, tangible computer-readable medium having instructions stored thereon that, when executed by at least one computing device, cause the at least one computing device to perform operations comprising:
- streaming content for display on a display device;
- determining an end of a teaser portion has been reached in the streaming of the content to the display device;
- enabling a skip command, responsive to the determining the end of the teaser portion has been reached in the streaming of the content to the display device using crowdsourced metadata relating to the content, wherein enabling the skip command comprises providing a skip icon corresponding to the enabled skip command for display on the display device during a title sequence/opening credits portion of the content;
- responsive to enabling the skip command, receiving input selecting the skip icon to skip the title sequence/opening credits portion of the content;
- determining an end to the title sequence/opening credits portion of the content using the crowdsourced metadata; and
- advancing the streaming of the content to the end of the title sequence/opening credits portion of the content.

13. The non-transitory, tangible computer-readable medium of claim 12, wherein determining the end of the teaser portion has been reached comprises:
- accessing an index in the crowdsourced metadata;
- accessing a first pointer in the index corresponding to the end of the teaser portion in the content; and
- using the first pointer to determine that the end of the teaser portion has been reached in the streaming of the content to the display device.

14. The non-transitory, tangible computer-readable medium of claim 13, wherein determining the end to the title sequence/opening credits portion of the content comprises:
- accessing the index in the crowdsourced metadata; and
- accessing a second pointer in the index corresponding to the end of the title sequence/opening credits portion of the content;
- wherein advancing the streaming of the content comprises using the second pointer to advance the streaming of the content to the end of the title sequence/opening credits portion of the content.

15. The non-transitory, tangible computer-readable medium of claim 14, further comprising:
- receiving command input to begin a fast forward operation;
- determining a first location in the streaming of the content corresponding to the receipt of the command input to begin the fast forward operation;
- receiving command input to discontinue the fast forward operation;
- determining a second location in the streaming of the content corresponding to the receipt of the command input to discontinue the fast forward operation; and
- providing information identifying the first location and the second location to at least one crowd source server, wherein the at least one crowd source server uses the information from a plurality of media devices to determine crowd sourced determinations of the end of the teaser portion in the content and the end of the title sequence/opening credits portion of the content.

16. The non-transitory, tangible computer-readable medium of claim 15, wherein determining the first location comprises:
- determining the first location is within a monitoring window associated with the content.

* * * * *